(12) United States Patent
Zayas et al.

(10) Patent No.: US 7,009,797 B2
(45) Date of Patent: *Mar. 7, 2006

(54) METHOD OF TAGGING CALIBRATION RESULTS WITH TEMPERATURE, TIME AND/OR VOLTAGE

(75) Inventors: Fernando Zayas, Loveland, CO (US); Stephen G. Paul, Santa Cruz, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/890,807

(22) Filed: Jul. 14, 2004

(65) Prior Publication Data

US 2006/0012909 A1    Jan. 19, 2006

(51) Int. Cl.
*G11B 15/18* (2006.01)

(52) U.S. Cl. ...................................................... 360/69
(58) Field of Classification Search .................. 360/69
See application file for complete search history.

(56) References Cited

U.S. PATENT DOCUMENTS

2002/0174729 A1 * 11/2002 Danninger ............... 73/861.63

* cited by examiner

*Primary Examiner*—David Hudspeth
*Assistant Examiner*—Mitchell Slavitt
(74) *Attorney, Agent, or Firm*—Fliesler Meyer LLP

(57) ABSTRACT

The results of a calibration can be stored in a hard disk drive along with a hard disk condition indication. After the hard disk is re-started, it can be checked to see whether the stored hard disk condition indication is sufficiently close to a current hard disk condition indication. If the condition indication is sufficiently close, the stored calibration results can be used.

23 Claims, 2 Drawing Sheets

METHOD OF TAGGING CALIBRATION RESULTS WITH TEMPERATURE, TIME AND/OR VOLTAGE

FIELD OF THE INVENTION

The present invention relates to the performance of Hard Disk Drives (HDDs), especially to the calibrating of Hard Disk Drives.

BACKGROUND

Rotating media storage devices are an integral part of computers and other devices with needs for large amounts of reliable memory. Rotating media storage devices are inexpensive, relatively easy to manufacture, forgiving where manufacturing flaws are present, and capable of storing large amounts of information in relatively small spaces.

A typical rotating media storage device uses a rotatable storage medium with a head disk assembly and electronics to control operation of the head disk assembly. The head disk assembly can include one or more disks. In a magnetic disk drive, a disk includes a recording surface to receive and store user information. The recording surface can be constructed of a substrate of metal, ceramic, glass or plastic with a thin magnetizable layer on either side of the substrate. Data is transferred to and from the recording surface via a head mounted on an arm of the actuator assembly. Heads can include one or more read and/or write elements, or read/write elements, for reading and/or writing data. Drives can include one or more heads for reading and/or writing. In magnetic disk drives, heads can include a thin film inductive write element and a magneto-resistive (MR) read element.

The hard disk drives are typically calibrated to make them work, or operate more optimally. Examples of calibrations results include Servo bias, Kt/J, Runout harmonics, Position Error Signal (PES) calibration, write current and read head bias. The calibration values can vary over time, temperature, and voltage so in many cases calibration is done after each power up. For mobile devices this can be a problem because periodic calibrations can consume battery power and/or delay work for a user's I/O request.

BRIEF SUMMARY

In one embodiment of the present invention, calibration results are stored along with a hard disk condition indication. The hard disk condition indication can be temperature, a time indication, a voltage indication or some other hard disk indication. After the restart of the hard disk drive, it is checked whether the stored hard disk indication is sufficiently close to the current hard disk condition indication. If so, the stored calibration results are used. If not, all or a portion of the hard disk drive is re-calibrated and new calibration results are used. In one embodiment, the limitations need not repeat the entire calibration. Limited calibration can be done for a given head or zone and tag with current indication with more resolution than entire calibration.

DETAILED DESCRIPTION

Figure 1:
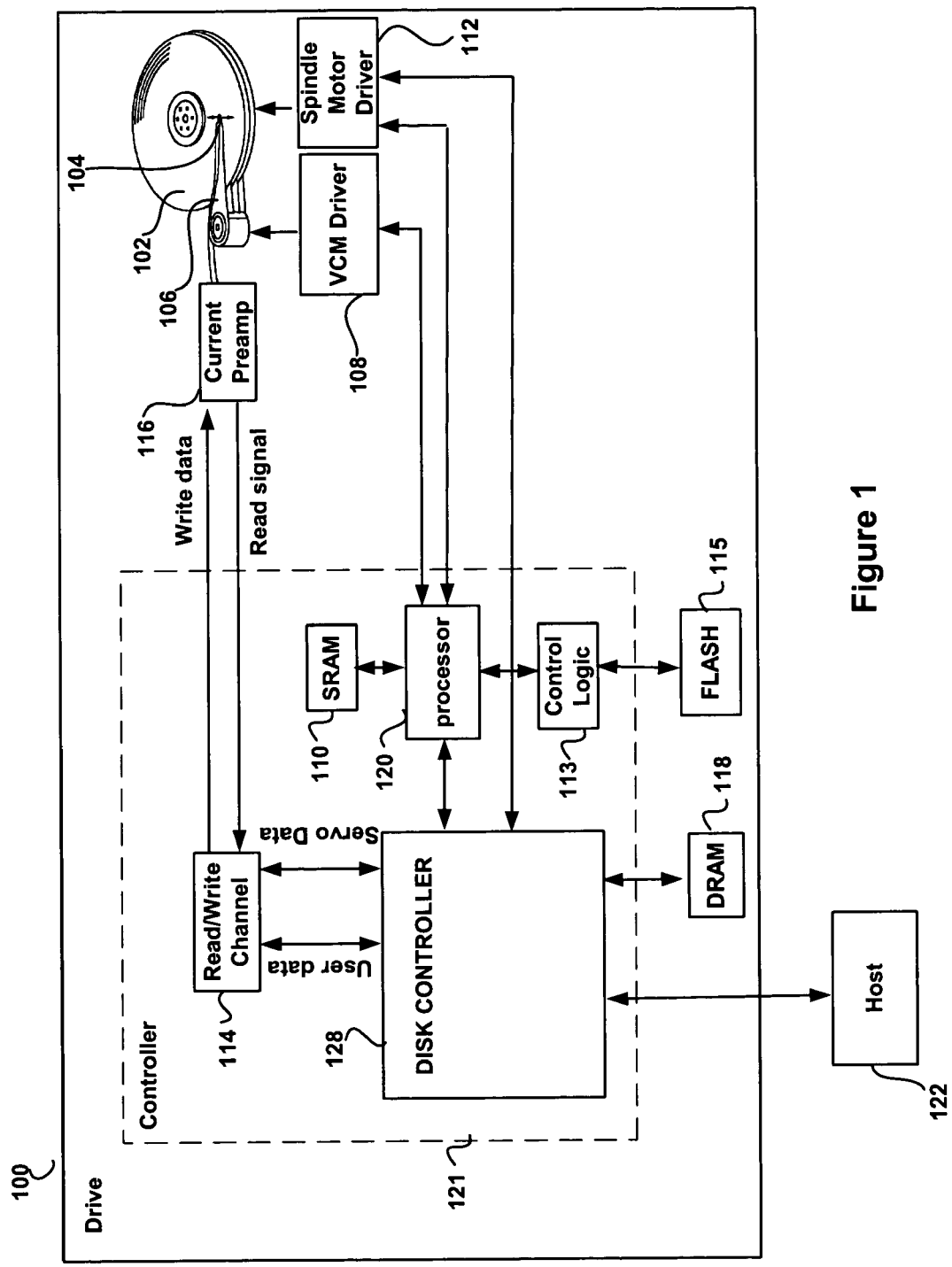
FIG. 1 is a diagram of a rotating media storage device of one embodiment of the present invention.

FIG. 1 shows a rotating media storage device 100 that can be used in accordance with one embodiment of the present invention. In this example, the rotating media storage device 100 is a hard disk drive. The rotating media storage device 100 includes at least one rotatable storage medium 102 capable of storing information on at least one surface. Numbers of disks and surfaces may vary by disk drive. In a magnetic disk drive, the storage medium 102 is a magnetic disk. A closed loop servo system, including an actuator arm 106, can be used to position head 104 over selected tracks of disk 102 for reading or writing, or to move head 104 to a selected track during a seek operation. In one embodiment, head 104 is a magnetic transducer adapted to read data from and write data to the disk 102. In another embodiment, head 104 includes separate read elements, such as magnetoresistive (MR) read heads, and write elements. Multiple head configurations may be used.

The servo system can include an actuator unit 108, which may include a voice coil motor driver to drive a voice coil motor (VCM) for rotating the actuator arm 106. The servo system can also include a spindle motor driver 112 to drive a spindle motor (not shown) for rotation of the disk 102. Controller 121 can be used to control the rotating media storage device 100. The controller 121 can include a number of arrangements. In one embodiment, the controller includes a disk controller 128, read/write channel 114, processor 120, SRAM 110, and control logic 113 on one chip. These elements can also be arranged on multiple chips. The controller can include fewer elements as well.

In one embodiment, the controller 121 is used to control the VCM driver 108 and spindle motor driver 112, to accept information from a host 122 and to control many disk functions. A host can be any device, apparatus, or system capable of utilizing the data storage device, such as a personal computer or mobile appliance. The controller 121 can include an interface controller in some embodiments for communicating with a host and in other embodiments; a separate interface controller can be used. The controller 121 can also include a servo controller, which can exist as circuitry within the drive or as an algorithm resident in the controller 121, or as a combination thereof. In other embodiments, an independent servo controller can be used.

Disk controller 128 can provide user data to a read/write channel 114, which can send signals to a current amplifier or pre-amp 116 to be written to the disk(s) 102, and can send servo signals to the microprocessor 120. Controller 121 can also include a memory controller to interface with memory such as the DRAM 118 and FLASH memory 115. FLASH memory 115 can be used as non-volatile memory to store a code image. Other nonvolatile memories such as ferrous RAM and NVRAM can be used. DRAM 118 can be used as a buffer memory and to store the code to be executed along with the SRAM 110. The controller 121 can implement the calibration method of the present invention described below.

Figure 2:
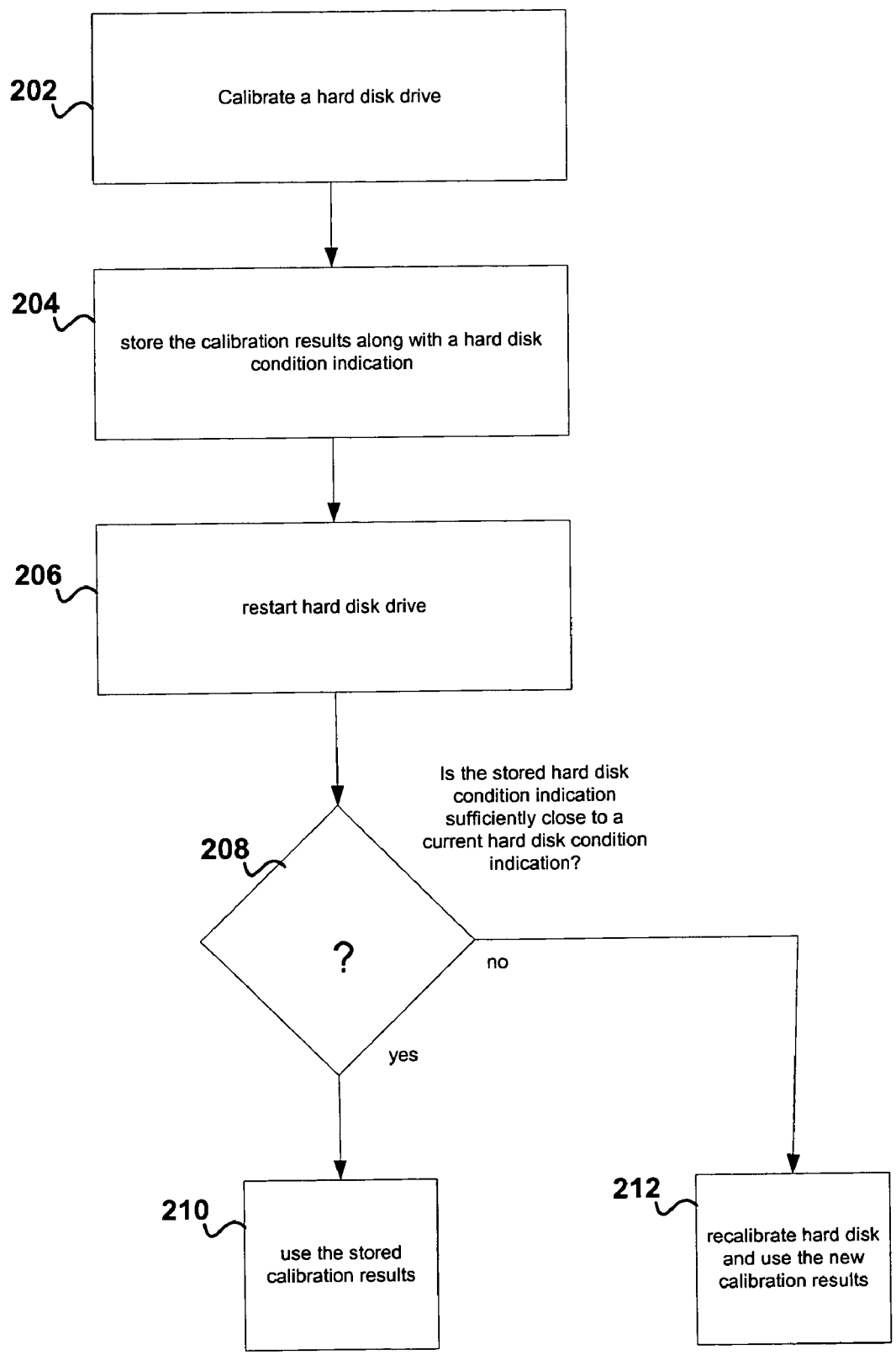
FIG. 2 is a flow chart of a method of the present invention.

FIG. 2 illustrates one embodiment of the present invention. In step 202, the hard disk drive is calibrated. The calibration can be for servo bias, Kt/J, runout harmonics, position error signal (PES) calibration, write current calibration and write head bias or any other calibration.

In step 204, the calibration results are stored along with a hard disk condition indication. The calibration results are preferably stored in non-volatile storage. Looking at FIG. 1, the non-volatile storage of the hard disk drive can include the flash 115 and the disk 102. In one embodiment, the information can be stored in a searchable database accessible by hard disk condition indication(s). The hard disk condition indication can include temperature, time, voltage, such as battery voltage, or some function of such metrics. Alternate hard disk condition indications can also be used.

Additionally, more than one hard disk condition indication can be stored along with the calibration results. The calibration results can be used for operating the hard disk drive. In one embodiment, the hard disk condition indications are related to the calibration results. For example, servo bias, Kt/J, runout harmonics, PES calibrations, write current are dependent upon temperature. Kt/J is an example of a calibration result that is dependent upon voltage. The read head bias is dependent upon time. The time indication can be hours operating, a real time indication or an indication of the time a bias current is applied to a read sensor. In step 206, the hard disk drive is restarted. In step 208, after the power up, the stored hard disk drive condition indication is used to determine whether to re-calibrate the hard disk drive. In one embodiment, if the stored hard disk drive condition is sufficiently close to the current hard disk condition indication, then in step 210, the stored calibration results are used. If not, in step 212, the hard disk drive is re-calibrated and the new calibration results are used. In one example, if the hard disk condition indication is temperature and current temperature is within a few degrees of the stored hard disk condition indication then the stored calibration results can be used, otherwise a re-calibration can be done. The recalibration can be partial. For example in one embodiment, the recalibration can be limited to a given head, part of a stroke, or read/write zone.

The hard disk drive can store a range of different calibrations, and different hard disk condition indications. Temperature will tend be the most important of these. A time indication can give some additional information for the determination of step 208. For example, the most resent calibration results within a temperature range can be used if there is a match. Additionally, in one embodiment, calibration results which are older than a certain time period are not used.

The foregoing description of preferred embodiments of the present invention has been provided for the purpose of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its practical application, thereby enabling others skilled in the art to understand the invention for various embodiments and with various modifications that are suited to the particular use contemplated. In is intended that the scope of the invention be defined by the claims and their equivalents.

What is claimed is:

1. A method of operating a hard disk drive comprising:
   calibrating all or a portion of the hard disk drive;
   storing the calibration results along with a hard disk condition indication in a non-volatile memory of the hard disk drive; and
   after a later power-up, using the stored hard disk condition indication to determine whether to recalibrate all or a part of the hard disk drive.

2. The method of claim 1, wherein, after the later power-up, a later hard disk condition indication is compared to the hard disk condition indication.

3. The method of claim 2, wherein based on the comparison it is determined determine whether to recalibrate all or a part of the hard drive.

4. The method of claim 1, wherein if the later hard disk conditions are close to the stored hard disk conditions a recalibration is not done.

5. The method of claim 1, wherein the stored calibration results are used if a recalibration is not done.

6. The method of claim 1, wherein the stored hard disk condition indication indicates temperature.

7. The method of claim 6, wherein if, after a later power-up, the temperature is within a preset range from the temperature indicated by the stored hard disk condition indication, recalibration is not done and the stored calibration results are used.

8. The method of claim 6, wherein the hard disk drive includes a temperature sensor.

9. The method of claim 1, wherein the stored hard disk condition indication indicates a time measurement.

10. The method of claim 9, wherein the time measurement is a measurement of hard disk time-on.

11. The method of claim 10, wherein the time measurement is a measurement of time that a bias current is applied to read sensor.

12. The method of claim 9, wherein if, after a later power-up, the time measurement is within a preset range of the time measurement indicated by the stored hard disk condition indication, recalibration is not done and the stored calibration results are used.

13. The method of claim 1, wherein the hard disk condition indication is a battery indication.

14. The method of claim 13, wherein the battery indication is a battery voltage indication.

15. The method of claim 1, wherein the hard disk condition indication is a function of temperature, time, and/or battery voltage.

16. The method of claim 1, wherein the calibration results relate to bias.

17. The method of claim 1, wherein the calibration results relate to KT/J.

18. The method of claim 1, wherein the calibration results relate to the runout harmonics.

19. The method of claim 1, wherein the calibration results relate to the write current.

20. The method of claim 1, wherein the calibration results relate to the PES calibration.

21. The method of claim 1, wherein the non-volatile memory is a disk of the hard disk drive.

22. The method of claim 1, wherein the non-volatile memory is a flash memory.

23. The method of claim 1, wherein the non-volatile memory is NVRAM.

* * * * *